(12) United States Patent
Ota et al.

(10) Patent No.: US 7,850,353 B2
(45) Date of Patent: Dec. 14, 2010

(54) TAIL LAMP STRUCTURE

(75) Inventors: Hiroyasu Ota, Saitama (JP); Hayato Ohashi, Saitama (JP); Eiji Ashihara, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 290 days.

(21) Appl. No.: 12/051,318

(22) Filed: Mar. 19, 2008

(65) Prior Publication Data

US 2008/0232122 A1 Sep. 25, 2008

(30) Foreign Application Priority Data

Mar. 23, 2007 (JP) ............................. 2007-077552

(51) Int. Cl.
*F21S 8/10* (2006.01)
(52) U.S. Cl. .................. 362/545; 362/540; 362/249.02
(58) Field of Classification Search ................ 362/219, 362/231, 240–245, 297, 308–310, 327–346, 362/485, 487, 498, 516–522, 540–545, 800
See application file for complete search history.

(56) References Cited

U.S. PATENT DOCUMENTS

| | | | | |
|---|---|---|---|---|
| 6,672,746 B2 * | 1/2004 | Amano | ...................... | 362/545 |
| 6,796,695 B2 * | 9/2004 | Natsume | ...................... | 362/518 |
| 6,805,476 B2 * | 10/2004 | Amano | ...................... | 362/545 |
| 6,814,475 B2 * | 11/2004 | Amano | ...................... | 362/487 |
| 6,814,480 B2 * | 11/2004 | Amano | ...................... | 362/545 |
| 2006/0285348 A1 | 12/2006 | Valcamp et al. | | |

FOREIGN PATENT DOCUMENTS

| | | |
|---|---|---|
| EP | 1 464 888 A2 | 10/2004 |
| EP | 1 886 871 A1 | 2/2008 |
| JP | 2003-229005 A | 8/2003 |

* cited by examiner

*Primary Examiner*—Hargobind S Sawhney
(74) *Attorney, Agent, or Firm*—Birch, Stewart, Kolasch & Birch, LLP

(57) ABSTRACT

To provide a tail lamp structure wherein a height in an upward and downward direction can be reduced to achieve miniaturization thereof. A tail lamp structure is equipped at a rear portion of a motorcycle. A board on which a stop lamp LED and a tail lamp LED are mounted in a spaced relationship from each other forwardly and backwardly is disposed in the forward and backward direction of the vehicle. The stop lamp LED and said tail lamp LED are isolated from each other by a reflector.

20 Claims, 2 Drawing Sheets

TAIL LAMP STRUCTURE

CROSS-REFERENCE TO RELATED APPLICATIONS

The present application claims priority under 35 USC 119 to Japanese Patent Application No. 2007-077552 filed on Mar. 23, 2007 the entire contents of which are hereby incorporated by reference.

BACKGROUND OF THE INVENTION

1. Field of the Invention

This invention relates to a tail lamp structure for use with a stop lamp or a tail lamp in a motorcycle.

2. Description of Background Art

A conventional tail lamp structure is known wherein a tail lamp structure includes LEDs that are disposed in a juxtaposed relationship in an upward and downward direction of a vehicle. See, for example, Japanese Patent Laid-Open No. 2003-229005.

However, in the conventional tail lamp structure described above, since the LEDs are disposed in a juxtaposed relationship in an upward and downward direction of the vehicle, an increased height dimension in the upward and downward direction is required.

Further, together with the arrangement of the LEDs, also the boards for mounting the LEDs thereon must also be juxtaposed in the upward and downward direction of the vehicle. Thus, the degree of freedom is disturbed in terms of the design.

SUMMARY AND OBJECTS OF THE INVENTION

It is an object of an embodiment of the present invention to eliminate the problems described above by providing a tail lamp structure whose height in an upward and downward direction can be reduced to achieve miniaturization thereof.

In order to attain an object of an embodiment of the present invention, a tail lamp structure equipped at a rear portion of a motorcycle is provided wherein a board on which a stop lamp LED and a tail lamp LED are mounted in a spaced relationship from each other forwardly and backwardly is disposed in the forward and backward direction of the vehicle. In addition, the stop lamp LED and the tail lamp LED are isolated from each other by a reflector.

According to an embodiment of the present invention, the tail lamp structure is provided wherein the stop lamp LED is disposed at an upper portion of the board, and a different stop lamp LED is disposed at a lower portion of the board.

According to an embodiment of the present invention, the tail lamp structure is provided wherein a different reflector is arranged forwardly of the reflector, and the plurality of reflectors are disposed in the forward and backward direction.

According to an embodiment of the present invention, a tail lamp structure equipped at a rear portion of a motorcycle is provided a board is disposed in the forward and backward direction of the vehicle, and a tail lamp LED is disposed on the upper side of the board with a license lamp LED being disposed on the lower side of the board.

With the tail lamp structure according to an embodiment of the present invention, the board on which the stop lamp LED and the tail lamp LED are mounted in a forwardly and backwardly spaced relationship from each other and are arranged in the forward and backward direction of the vehicle. Thus, the height of the tail lamp structure in the upward and downward direction of the vehicle is reduced, and miniaturization can be anticipated.

With the tail lamp structure according to an embodiment of the present invention, since the stop lamp LED is mounted at the upper portion of the board and the different stop lamp LED is mounted at the lower portion of the board, the stop lamp indication can be performed by a great emission light amount.

With the tail lamp structure according to an embodiment of the present invention, since a different reflector is arranged forwardly of the reflector and the plurality of reflectors are arranged in the forward and backward directions of the vehicle, the stop lamp light emitting portion and the tail lamp light emitting portion can be indicated in a partitioned state from each other in the single tail lamp.

With the tail lamp structure according to an embodiment of the present invention, since tail lamp indication is performed on the upper side of the board while license lamp irradiation can be performed on the lower side of the board, the necessity to provide the license lamp at a different place is eliminated, which makes the tail lamp structure smart in design.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

In the following, a plurality of preferred embodiments of a tail lamp structure according to the present invention are described in detail with reference to the drawings.

Figure 1:
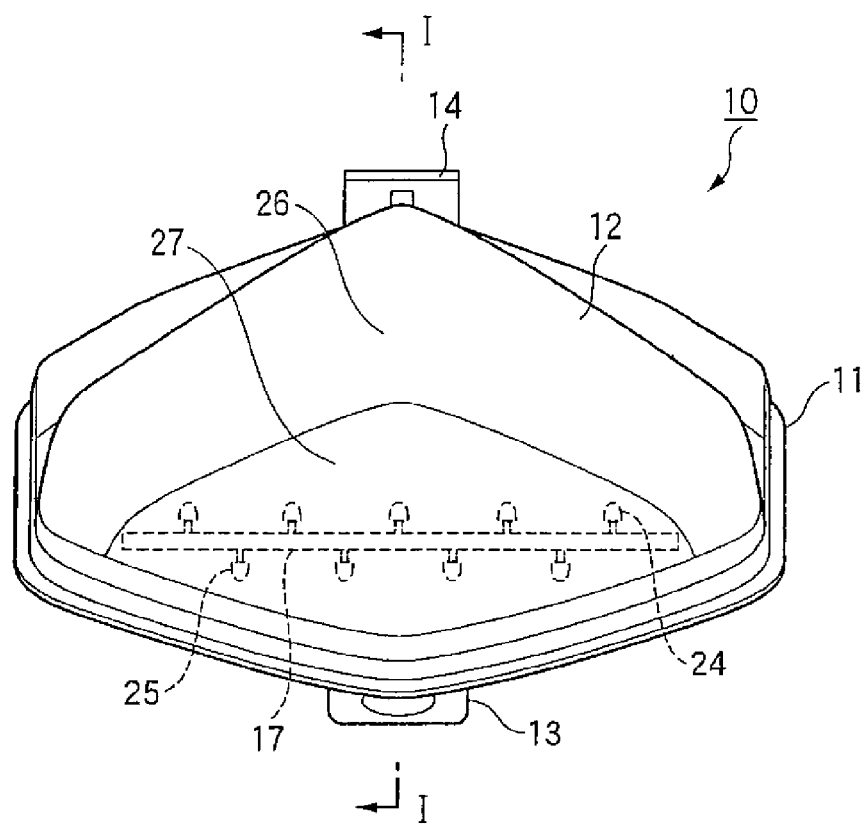
FIG. 1 is a front elevational view of a tail lamp unit which uses a tail lamp structure of a first embodiment according to the present invention.
Figure 2:
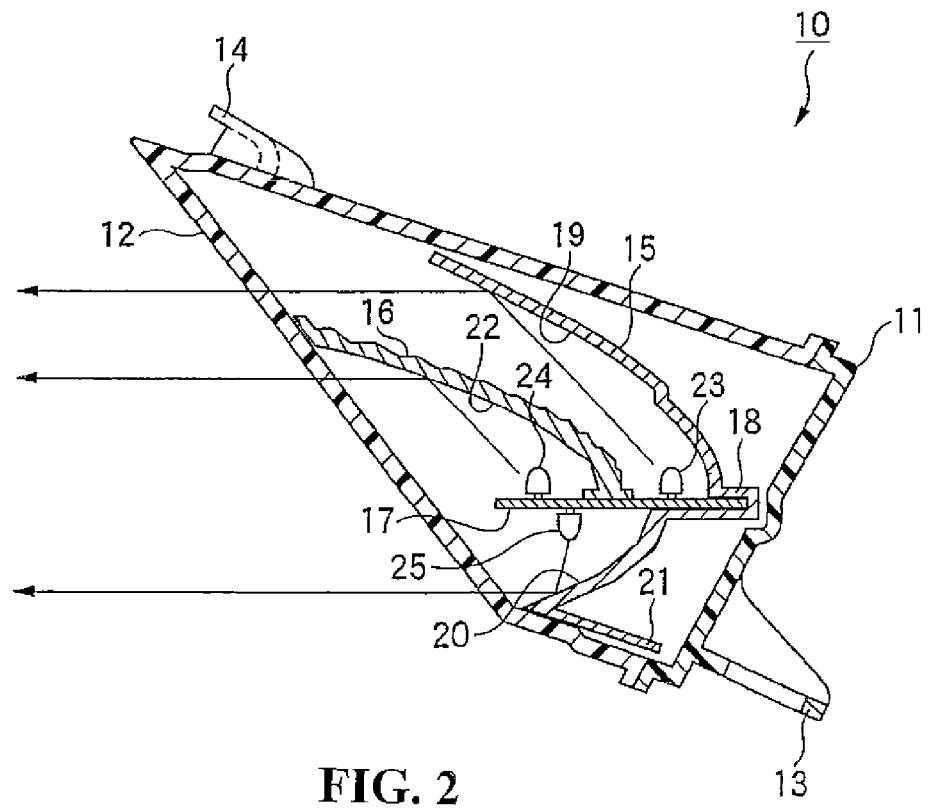
FIG. 2 is a sectional view taken along line I-I of FIG. 1.

FIGS. 1 and 2 show a first embodiment of the present invention, wherein FIG. 1 is a front elevational view of a tail lamp unit which uses the tail lamp structure according to the present invention and FIG. 2 is a sectional view taken along line I-I of FIG. 1. It is to be noted that the terms front, back, right and left in the description represent directions as viewed from an operator of the motorcycle.

As shown in FIG. 1, the tail lamp unit 10 which uses the tail lamp structure of the present invention includes a tail lamp case 11 and a tail lamp lens 12.

The tail lamp case 11 is made of a resin material having a color conforming to the color of the vehicle. A bracket 13 for attachment to the vehicle is formed at a front portion of the tail lamp case 11 such that it projects obliquely forwardly.

The tail lamp lens 12 is made of a red resin material and is formed in a triangular shape as viewed in a vertical section which tapers rearwardly. A securing portion 14 of a hook shape which is secured to a rear cowl, not shown, is assembled so as to cover a seat frame, not shown, that is formed in such a manner so as to project obliquely rearwardly.

As shown in FIG. 2, the tail lamp unit 10 accommodates two reflectors including a first reflector 15 and a second reflector 16, and a board 17.

The first reflector 15 has formed at a central portion thereof a board retaining portion 18 of a channel shape which grips the board 17. In addition, a tail lamp reflecting face 19 is formed at an upper portion on the rear side of the board retaining portion 18 such that it extends in a curved shape obliquely upwardly and rearwards of the vehicle. Further, a first stop lamp reflecting face 20 is formed at a lower portion on the rear side of the board retaining portion 18 such that it extends in a curved shape obliquely downwardly and rearwards of the vehicle. The first reflector 15 is secured at a case side securing portion 21 at a lower end portion thereof to a bottom portion of the tail lamp case 11.

The second reflector 16 is secured at a lower end portion thereof to the board 17 on the rear side of the vehicle with respect to the first reflector 15. A second stop lamp reflecting face 22 is formed at an upper portion on the rear side of the board 17 such that it extends in a curved shape obliquely upwardly and rearwards of the vehicle.

The board 17 is attached to the board retaining portion 18 of the first reflector 15 such that it is disposed substantially horizontally in the forward and backward direction of the vehicle. On an upper face of the board 17, a red tail lamp LED (Light Emitting Diode) 23 is mounted at a rear portion of the tail lamp reflecting face 19 of the first reflector 15, and a red first stop lamp LED 24 is mounted at a rear portion of the second stop lamp reflecting face 22 of the second reflector 16. In addition, on a lower face of the board 17, a red second stop lamp LED 25 is mounted at a rear portion of the first stop lamp reflecting face 20 of the first reflector 15.

Since the board 17 is electrically connected to a tail lamp control circuit and a stop lamp control circuit carried on the vehicle through a connector or the like not shown, the tail lamp LED 23 emits light with current supplied thereto from the tail lamp control circuit and the stop lamp LEDs 24 and 25 emit light with current supplied thereto from the stop lamp control circuit.

At this time, the emission light emitted from the tail lamp LED 23 is reflected by the second stop lamp reflecting face 22 of the second reflector 16 and then comes to an upper half of the tail lamp lens 12 to perform a tail lamp indication at a tail lamp indication portion (refer to FIG. 1) 26 at an upper portion of the tail lamp lens 12.

The emission light emitted from the first stop lamp LED 24 is reflected by the second stop lamp reflecting face 22 of the second reflector 16 and then comes to a lower half of the tail lamp lens 12. Further, the emission light emitted from the second stop lamp LED 25 is reflected by the first stop lamp reflecting face 20 of the first reflector 15 and then comes to the lower half of the tail lamp lens 12 to perform a stop lamp indication by a stop lamp indication portion (refer to FIG. 1) 27 at a lower portion of the tail lamp lens 12.

In the tail lamp structure of the first embodiment described above, since the board 17 on which the first stop lamp LED 24 and the second stop lamp LED 25 as well as the tail lamp LED 23 are mounted in a forwardly and backwardly spaced relationship from each other and are arranged in the forward and backward direction of the vehicle, the height of the tail lamp structure in the upward and downward direction of the vehicle is reduced, and miniaturization can be anticipated.

Further, in the tail lamp structure of the first embodiment described above, since the first stop lamp LED 24 is mounted at the upper portion of the board 17 and the second stop lamp LED 25 is mounted at the lower portion of the board 17, the stop lamp indication can be performed by a great emission light amount.

Further, in the tail lamp structure of the first embodiment described above, since the first reflector 15 is arranged forwardly of the second reflector 16 and the first reflector 15 and the second reflector 16 are arranged in the forward and backward directions of the vehicle, the stop lamp indication portion 27 and the tail lamp indication portion 26 can be indicated in a partitioned state from each other in the single tail lamp unit 10.

Figure 3:
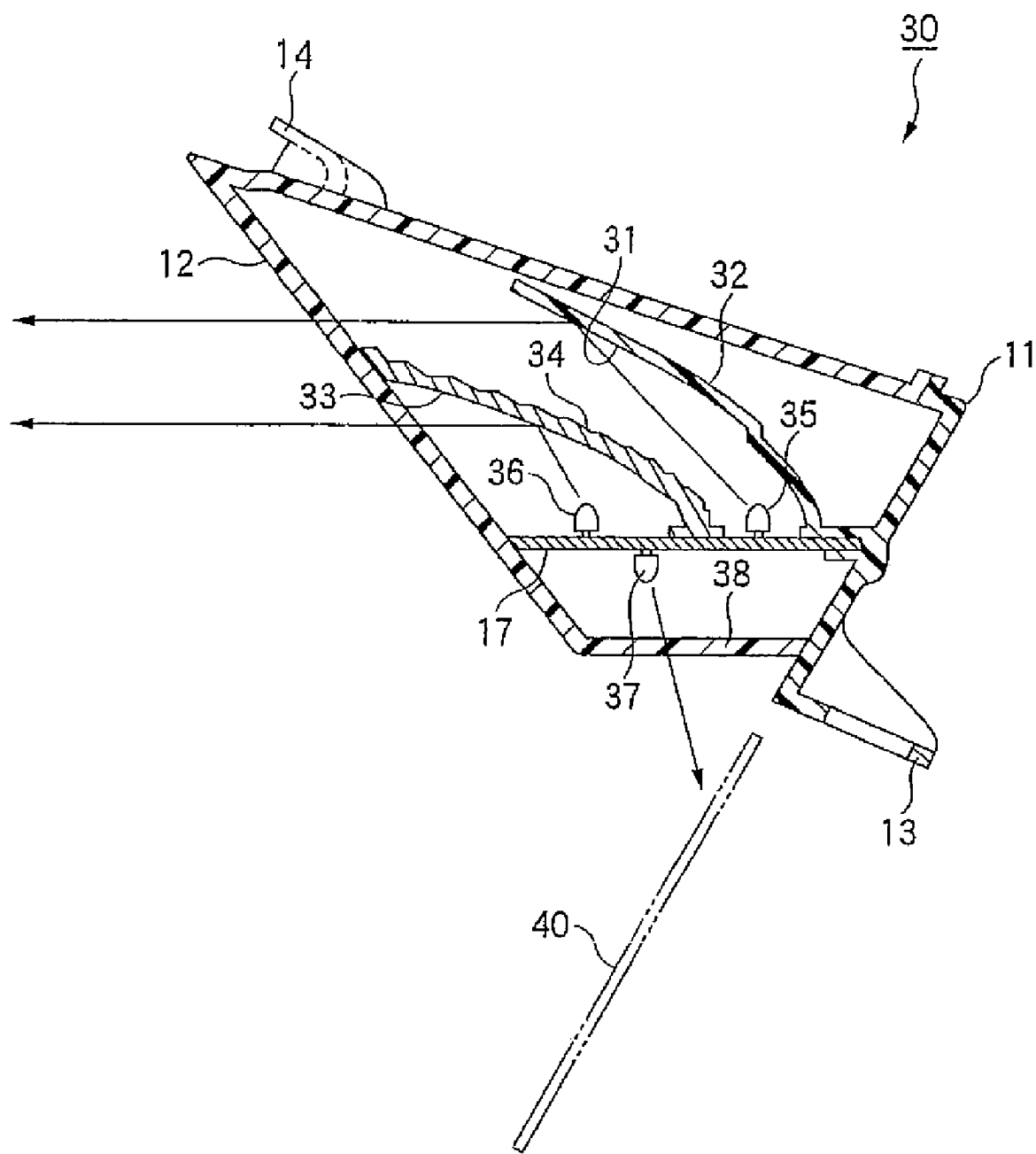
FIG. 3 is a sectional view of a tail lamp unit which uses a tail lamp structure of a second embodiment of the present invention corresponding to the section taken along line I-I of FIG. 1.

Now, a second embodiment of the tail lamp structure of the present embodiment is described with reference to FIG. 3. FIG. 3 is a sectional view of a tail lamp unit which uses the tail lamp structure of the second embodiment of the present invention corresponding to the section taken along line I-I of FIG. 1. It is to be noted that, in the following description of the second embodiment, a description of the components overlapping with those and components similar in function to those of the first embodiment described above is simplified or omitted by applying like or corresponding reference numerals to the components.

As shown in FIG. 3, in the tail lamp unit 30 of the second embodiment, a first reflector 32 is provided having a tail lamp reflecting face 31 extending in a curved shape obliquely upwardly and rearwards of the vehicle and a second reflector 34 is arranged rearwardly of the first reflector 32 with a stop lamp reflecting face 33 extending in a curved shape obliquely upwardly and rearwards being arranged on an upper face of a board 17 which is assembled substantially horizontally in the forward and backward direction to the tail lamp unit 30.

On an upper face the board 17, a red tail lamp LED 35 is mounted at a rear portion of the tail lamp reflecting face 31 of the first reflector 32, and a red stop lamp LED 36 is mounted at a rear portion of the stop lamp reflecting face 33 of the second reflector 34. Meanwhile, a clear color license lamp LED 37 is mounted on a lower face of the board 17.

The tail lamp lens 12 has a transparent clear lens 38 arranged substantially horizontally at a lower end portion thereof, and a license plate 40 (imaginary line) is arranged below the tail lamp unit 30.

Emission light emitted from the tail lamp LED 35 is reflected by the tail lamp reflecting face 31 of the first reflector 32 and then comes to an upper half of the tail lamp lens 12 to perform a tail lamp indication at a tail lamp indication portion 26 (refer to FIG. 1) at an upper portion of the tail lamp lens 12.

The emission light emitted from the stop lamp LED 36 is reflected by the stop lamp reflecting face 33 of the second reflector 34 and then comes to a central portion of the tail lamp lens 12 to perform a stop lamp indication by a stop lamp indication portion 27 (refer to FIG. 1) at a lower portion of the tail lamp lens 12.

On the other hand, the emission light emitted from the license lamp LED 37 comes to the clear lens 38 at a lower end portion of the tail lamp lens 12 and irradiates upon the license plate 40.

The tail lamp structure of the second embodiment exhibits action and effects similar to those of the first embodiment. More particularly, in the tail lamp structure of the second embodiment since the tail lamp indication and stop lamp indication are performed on the upper side of the board 17 while license lamp irradiation can be performed on the lower side of the board 17, the necessity to provide the license lamp at a different place is eliminated, which makes the tail lamp structure smart in design.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A tail lamp structure adapted for mounting at a rear portion of a vehicle, comprising:
    a board on which a stop lamp LED and a tail lamp LED are mounted in a spaced relationship from each other forwardly and backwardly, said board being disposed in the forward and backward direction of the vehicle;
    said stop lamp LED and said tail lamp LED being isolated from each other by a reflector.

2. The tail lamp structure according to claim 1, wherein said stop lamp LED is disposed at an upper portion of said board, and a second stop lamp LED is disposed at a lower portion of said board.

3. The tail lamp structure according to claim 1, wherein a second reflector is arranged forwardly of said reflector and a plurality of reflectors are disposed in the forward and backward direction.

4. The tail lamp structure according to claim 2, wherein a second reflector is arranged forwardly of said reflector and a plurality of reflectors are disposed in the forward and backward direction.

5. The tail lamp structure according to claim 1, wherein a plurality of stop lamp the stop lamp LED includes a plurality of stop lamp LEDs.

6. The tail lamp structure according to claim 1, wherein a plurality of tail lamp the tail lamp LED includes a plurality of tail lamp LEDs.

7. The tail lamp structure according to claim 1, and further including a license lamp LED mounted on said board and illuminating a space disposed below the tail lamp structure.

8. The tail lamp structure according to claim 2, and further including a reflector disposed adjacent to said second stop lamp LED on the lower portion of the board for reflecting the illumination of the second stop lamp LED therefrom.

9. The tail lamp structure according to claim 1, wherein said reflector extends in a curved shape obliquely upwardly and rearwardly from the board.

10. A tail lamp structure adapted for mounting at a rear portion of a vehicle, comprising:
    a board mounted within a tail lamp case and extending in a forward and rearward direction of the vehicle;
    a stop lamp LED mounted on said board;
    a tail lamp LED mounted on said board, said stop lamp LED and said tail lamp LED being mounted on a same surface of said board in a spaced relationship from each other forwardly and rearwardly; and
    a reflector mounted on the board said stop lamp LED and said tail lamp LED in order to isolate the stop lamp LED and the tail lamp LED relative to each other.

11. The tail lamp structure according to claim 10, wherein said stop lamp LED is disposed at an upper portion of said board, and a second stop lamp LED is disposed at a lower portion of said board.

12. The tail lamp structure according to claim 10, wherein a second reflector is arranged forwardly of said reflector and a plurality of reflectors are disposed in the forward and backward direction.

13. The tail lamp structure according to claim 11, wherein a second reflector is arranged forwardly of said reflector and a plurality of reflectors are disposed in the forward and backward direction.

14. The tail lamp structure according to claim 10, wherein a plurality of stop lamp the stop lamp LED includes a plurality of stop lamp LEDs.

15. The tail lamp structure according to claim 10, wherein a plurality of tail lamp the tail lamp LED includes a plurality of tail lamp LEDs.

16. The tail lamp structure according to claim 10, and further including a license lamp LED mounted on said board and illuminating a space disposed below the tail lamp structure.

17. The tail lamp structure according to claim 11, and further including a reflector disposed adjacent to said second stop lamp LED on the lower portion of the board for reflecting the illumination of the second stop lamp LED downwardly.

18. The tail lamp structure according to claim 10, wherein said reflector extends in a curved shape obliquely upwardly and rearwardly from the board.

19. A tail lamp structure adapted for mounting at a rear portion of a vehicle, comprising:
    a board disposed in the forward and backward direction of the vehicle;
    a tail lamp LED being disposed on the upper side of said board; and
    a license lamp LED is disposed on the lower side of said board, wherein a light emitted from the license lamp LED shines on a license plate mounted on the vehicle below tail lamp structure.

20. The tail lamp structure according to claim 19,
    wherein a clear transparent lens is provided on a bottom part of the tail lamp structure, and
    wherein the light emitted from the license lamp LED is transmitted through the clear transparent lens and shines on the license plate mounted on the vehicle below tail lamp structure.

* * * * *